(12) United States Patent
Yun et al.

(10) Patent No.: US 11,756,734 B2
(45) Date of Patent: *Sep. 12, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Yong Jin Yun, Suwon-si (KR); So Ra Kang, Suwon-si (KR); Ki Pyo Hong, Suwon-si (KR); Byeong Gyu Park, Suwon-si (KR); Jong Ho Lee, Suwon-si (KR); Jung Min Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,870

(22) Filed: Nov. 18, 2021

(65) Prior Publication Data

US 2022/0076889 A1 Mar. 10, 2022

Related U.S. Application Data

(63) Continuation of application No. 16/864,754, filed on May 1, 2020, now Pat. No. 11,227,720.

(30) Foreign Application Priority Data

Jul. 17, 2019 (KR) .................. 10-2019-0086246

(51) Int. Cl.
*H01G 4/232* (2006.01)
*H01G 4/224* (2006.01)
(Continued)

(52) U.S. Cl.
CPC .......... *H01G 4/232* (2013.01); *H01G 4/1227* (2013.01); *H01G 4/224* (2013.01); *H01G 4/30* (2013.01)

(58) Field of Classification Search
CPC ........... H01G 4/30; H01G 4/12; H01G 4/248; H01G 4/012; H01G 4/1209; H01G 4/232;
(Continued)

(56) References Cited

U.S. PATENT DOCUMENTS 5,339,068 A * 8/1994 Tsunoda ................ H01C 1/142
338/308
5,907,272 A * 5/1999 McGuire .............. H01C 1/1406
337/183
(Continued)

FOREIGN PATENT DOCUMENTS

JP 2002-15939 A 1/2002
JP 2008-235698 A 10/2008
(Continued)

OTHER PUBLICATIONS

Notice of Allowance issued in corresponding U.S. Appl. No. 16/864,754 dated Nov. 3, 2021.
(Continued)

*Primary Examiner* — Michael P McFadden
(74) *Attorney, Agent, or Firm* — Morgan, Lewis & Bockius LLP

(57) ABSTRACT

A multilayer ceramic electronic component includes a body including a dielectric layer, first and second internal electrodes, a stacked portion including first and second surfaces opposing each other in a stacking direction of the first and second internal electrodes, third and fourth surfaces connected to the first and second surfaces and opposing each other, and fifth and sixth surfaces connected to the first and second surfaces, connected to the third and fourth surfaces,
(Continued)

and opposing each other, and a coating layer disposed on the first to sixth surfaces of the stacked portion and having first and second connection portions; and first and second external electrodes connected to the first and second internal electrodes, respectively, and arranged on the third and fourth surfaces of the body, wherein the first and second internal electrodes are respectively connected to the first and second external electrodes through the first and second connection portions.

24 Claims, 7 Drawing Sheets

(51) Int. Cl.
*H01G 4/12* (2006.01)
*H01G 4/30* (2006.01)

(58) Field of Classification Search
CPC .. H01G 4/0085; H01G 4/1227; H01G 4/2325; H01G 4/224
See application file for complete search history.

(56) References Cited

U.S. PATENT DOCUMENTS

| | | | | |
|---|---|---|---|---|
| 9,775,232 | B2 * | 9/2017 | Park | H01G 4/1227 |
| 11,227,720 | B2 * | 1/2022 | Yun | H01G 4/232 |
| 2016/0351332 | A1 * | 12/2016 | Lee | H01G 4/232 |
| 2017/0256359 | A1 * | 9/2017 | Masunari | H01G 4/005 |
| 2017/0309389 | A1 * | 10/2017 | Sato | H01F 27/29 |
| 2018/0286583 | A1 * | 10/2018 | Onoue | H01G 4/012 |
| 2018/0286591 | A1 | 10/2018 | Kim et al. | |
| 2019/0006103 | A1 | 1/2019 | Mochigi et al. | |

FOREIGN PATENT DOCUMENTS

| | | |
|---|---|---|
| JP | 2016-12640 A | 1/2016 |
| JP | 2016-201567 A | 12/2016 |
| KR | 10-2018-0110450 A | 10/2018 |

OTHER PUBLICATIONS

Office Action issued in corresponding U.S. Appl. No. 16/864,754 dated Aug. 25, 2021.
Chinese Office Action dated Jul. 22, 2022, issued in corresponding Chinese Patent Application No. 202010680629.0.

* cited by examiner

MULTILAYER CERAMIC ELECTRONIC COMPONENT

CROSS-REFERENCE TO RELATED APPLICATION

This application is a continuation application of U.S. patent application Ser. No. 16/864,754 filed on May 1, 2020, which claims the benefit of priority to Korean Patent Application No. 10-2019-0086246 filed on Jul. 17, 2019 in the Korean Intellectual Property Office, the disclosures of which are incorporated herein by reference in their entirety.

TECHNICAL FIELD

The present disclosure relates to a multilayer ceramic electronic component.

BACKGROUND

Among the capacitor components, the multilayer ceramic capacitor (MLCC) may be relatively small in size, may have a relatively high capacity, and may be relatively easy to be mounted.

Recently, it has been required to increase the capacity of a ceramic electronic component, particularly a stacked capacitor. In order to cope with this, methods for maximizing the effective volume of multilayer ceramic electronic components are being studied.

Among the methods of maximizing the effective volume, a method of attaching a separate margin portion in the width direction of the internal electrode may be proposed, but this method has a complicated process. In addition, there may be a problem that reliability for moisture resistance may be deteriorated, due to adhesion of the margin portion and thinning of the margin portion.

Therefore, there may be a need to develop a multilayer ceramic capacitor structure capable of improving the reliability for moisture resistance while maintaining a connection between the internal electrode and the external electrode for commercial applications of the ultra-high capacity multilayer ceramic capacitor.

SUMMARY

An aspect of the present disclosure is to provide a multilayer ceramic electronic component having improved reliability for moisture resistance.

Another aspect of the present disclosure is to provide a multilayer ceramic electronic component having improved mechanical strength.

Another aspect of the present disclosure is to provide a multilayer ceramic electronic component in which the electrode connection is improved by adjusting an exposed area of an internal electrode.

According to an aspect of the present disclosure, a multilayer ceramic electronic component includes a body including a dielectric layer, first and second internal electrodes, a stacked portion including first and second surfaces opposing each other in a stacking direction of the first and second internal electrodes, third and fourth surfaces connected to the first and second surfaces and opposing each other, and fifth and sixth surfaces connected to the first and second surfaces, connected to the third and fourth surfaces, and opposing each other, and a coating layer disposed on the first to sixth surfaces of the stacked portion and having first and second connection portions; and first and second external electrodes connected to the first and second internal electrodes, respectively, and arranged on the third and fourth surfaces of the body, wherein the first and second internal electrodes are respectively connected to the first and second external electrodes through the first and second connection portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
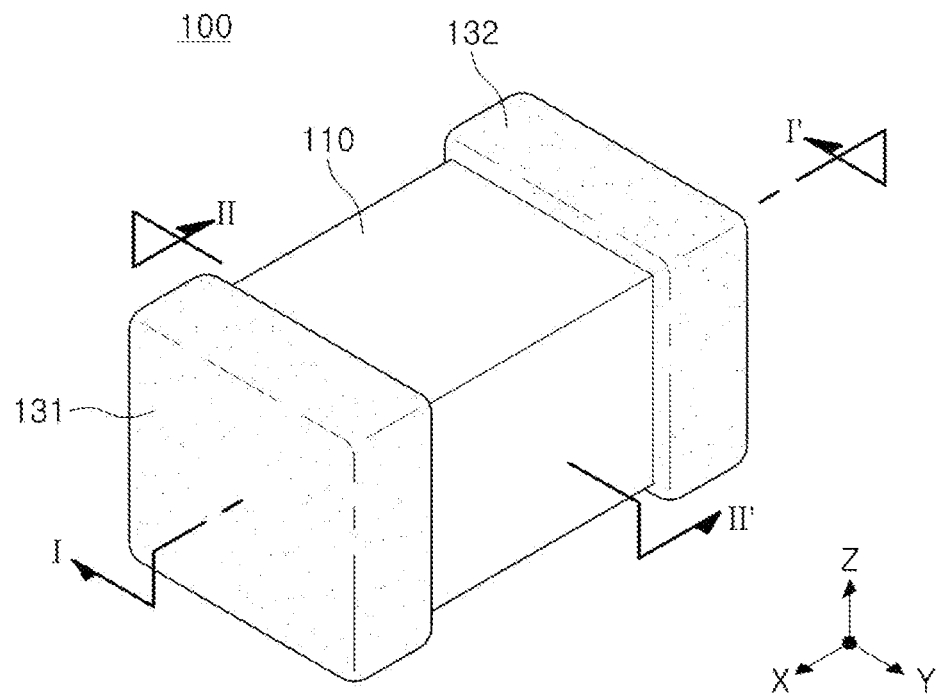
FIG. 1 is a schematic perspective view illustrating a multilayer ceramic electronic component according to an embodiment of the present disclosure.
Figure 2:
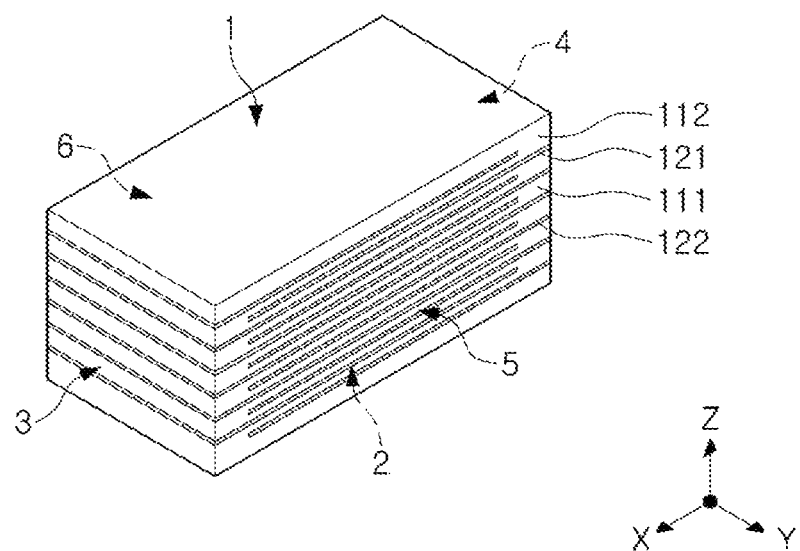
FIG. 2 is a schematic perspective view illustrating the body of FIG. 1.

Hereinafter, embodiments of the present disclosure will be described with reference to the concrete embodiments and the accompanying drawings. Embodiments of the present disclosure may be modified into various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

In order to clearly illustrate the present disclosure, parts not related to the description are omitted, and thicknesses are enlarged in order to clearly represent layers and regions, and similar portions are denoted by similar reference numerals throughout the specification. Throughout the specification, when an element is referred to as "comprising", it means that it may include other elements as well, rather than excluding other elements, unless specifically stated otherwise.

Hereinafter, to clearly explain an embodiment of the present disclosure, when a direction of a body 110 is defined, X, Y, and Z illustrated in the drawings denote a longitudinal direction (a first direction) of the body 110, a width direction (a second direction) of the body 110, and a thickness direction (a third direction) of the body 110, respectively. Further, in this embodiment, the Z direction may be used with the same concept as a stacking direction in which dielectric layers are stacked.

FIGS. 1 to 8 are views illustrating an embodiment of a multilayer ceramic electronic component according to the present disclosure. Referring to FIGS. 1 to 8, a multilayer ceramic electronic component 100 according to an embodiment of the present disclosure may include a body 110 including a dielectric layer 111, first and second internal electrodes 121 and 122, a stacked portion including first and second surfaces 1 and 2 opposing each other in a stacking direction of the first and second internal electrodes 121 and 122, third and fourth surfaces 3 and 4 connected to the first and second surfaces 1 and 2 and opposing each other, and fifth and sixth surfaces 5 and 6 connected to the first and second surfaces 1 and 2, connected to the third and fourth surfaces 3 and 4, and opposing each other, and a coating layer 151 disposed on the first to sixth surfaces of the stacked portion and having first and second connection portions 161 and 162; and first and second external electrodes 131 and 132 connected to the first and second internal electrodes 121 and 122, respectively, and arranged on the third and fourth surfaces 3 and 4 of the body.

In this case, the first and second internal electrodes 121 and 122 are respectively connected to the first and second external electrodes 131 and 132 through the first and second connection portions 161 and 162. The fact that the first and second internal electrodes 121 and 122 are respectively connected to the first and second external electrodes 131 and 132 through the first and second connection portions 161 and 162 means that the first and second internal electrodes 121 and 122 and the first and second external electrodes 131 and 132 are electrically connected to each other through the first and second connection portions 161 and 162, and means that the first and second internal electrodes 121 and 122 and the first and second external electrodes 131 and 132 are in contact with the first and second connection portions 161 and 162. When the first and second internal electrodes 121 and 122 and the first and second external electrodes 131 and 132 are connected through the first and second connection portions 161 and 162 as described above, the first and second connection portions 161 and 162 may function as electrical connection paths.

The body 110 may be formed by stacking and sintering the dielectric layer 111, in plural, in the Z direction. The body 110 may be integrated such that a boundary between the dielectric layers 111 of the body 110 adjacent to each other is difficult to determine without the use of a scanning electron microscope.

A specific shape of the body 110 is not particularly limited, but the body may have a hexahedral shape or a similar shape as illustrated in the drawings. Due to shrinkage of a ceramic powder contained in the body during the sintering process, the body may have a substantially hexahedral shape, although not a hexahedral shape with perfectly straight lines. The shapes and dimensions of the body 110 and the number of stacked layers of the dielectric layer 111 are not limited to those illustrated in the drawings of this embodiment.

According to an embodiment of the present disclosure, a raw material for forming the dielectric layer 111 is not particularly limited as long as sufficient capacitance may be obtained therewith. For example, a barium titanate-based material, a lead composite perovskite-based material, a strontium titanate-based material, or the like may be used.

In addition, the material for forming the dielectric layer 111 may be prepared by adding various ceramic additives, organic solvents, plasticizers, binders, dispersants, and the like to a powder of barium titanate ($BaTiO_3$) and the like, according to the purpose of the present disclosure.

The ceramic additives may be, for example, a transition metal oxide, a transition metal carbide, a rare earth element, magnesium (Mg), aluminum (Al), or the like.

The stacked portion may be formed by alternately stacking a ceramic green sheet in which the first internal electrode 121 is printed on the dielectric layer 111, and a ceramic green sheet on which the second internal electrode 122 is printed on the dielectric layer 111 in the thickness direction.

In an example of the present disclosure, the plurality of internal electrodes 121 and 122 may be arranged to oppose each other with the dielectric layer 111 interposed therebetween. The internal electrodes 121 and 122 may include first and second internal electrodes 121 and 122 arranged alternately to oppose each other with the dielectric layer 111 interposed therebetween.

The first internal electrode 121 may be exposed on one surface of the stacked portion in the first direction (the X direction). The second internal electrode 122 may be exposed to the other surface of the stacked portion in the first direction (the X direction). The first and second internal electrodes 121 and 122 may be electrically separated from each other by the dielectric layer 111 disposed therebetween.

The material for forming the first and second internal electrodes 121 and 122 is not particularly limited, and may be formed by using a conductive paste containing one or more among silver (Ag), palladium (Pd), gold (Au), platinum (Pt), nickel (Ni), copper (Cu), tin (Sn), tungsten (W), titanium (Ti), and alloys thereof. The conductive paste may be printed by a screen-printing method or a gravure printing method, but the present disclosure is not limited thereto.

An average thickness of the first and second internal electrodes 121 and 122 may be 0.4 µm or less. The average thickness of the internal electrodes may be an average of measured values at five different positions of the sintered internal electrodes. A lower limit of the average thickness of the first and second internal electrodes is not particularly limited, but may be 0.01 µm or more, for example.

In an example of the present disclosure, a cover portion 112 having a predetermined thickness may be formed on a lower portion of the internal electrode in a lowermost portion of the body 110 and on an upper portion of the internal electrode in an uppermost portion of the body 110. In this case, the cover portion 112 may have the same composition as the dielectric layer 111, and may be formed by stacking a dielectric layer not including the internal electrode on the upper portion of the internal electrode in the uppermost portion of the body 110 and on the lower portion of the internal electrode in the lowermost portion of the body 110.

The cover portion 112 may function to prevent damage to the internal electrode due to physical or chemical stress.

The first and second external electrodes 131 and 132 may be respectively arranged on both surfaces of the body in the first direction. The first and second external electrodes 131 and 132 may be respectively arranged on the third and fourth surfaces of the body. The first and second external electrodes 131 and 132 may be extended to and arranged on both surfaces of the body 110 in the third direction (the Z direction), and may be also extended to and arranged on both surfaces of the body 110 in the second direction (the Y direction).

The first and second external electrodes 131 and 132 may be extended to and arranged on a portion of the first and second surfaces 1 and 2 of the body. In this case, the first and second external electrodes 131 and 132 may be also extended to and arranged on a portion of the fifth and sixth surfaces 5 and 6 of the body.

A method for forming the first and second external electrodes 131 and 132 is not particularly limited. For example, the first and second external electrodes 131 and 132 may be formed by dipping, for example, the body in a paste containing a conductive metal and glass, or transferring a film dried with a metal paste onto the third and fourth surfaces of the body.

In an embodiment of the present disclosure, the first and second external electrodes 131 and 132 may be formed by using one or more among silver (Ag), gold (Au), platinum (Pt), nickel (Ni), copper (Cu), tin (Sn), tungsten (W), palladium (Pd), titanium (Ti), and alloys thereof. In addition, a plating layer may be formed on the first and second external electrodes 131 and 132 to improve the mounting properties with a substrate.

Figure 3:
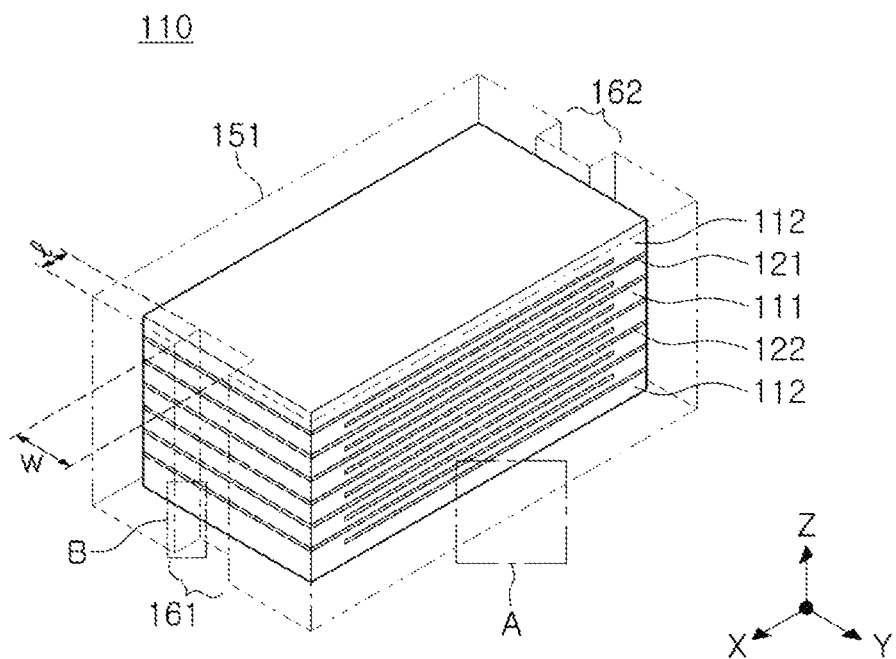
FIG. 3 is a schematic perspective view illustrating a body in which the coating layer of FIG. 2 is disposed.
Figure 4:
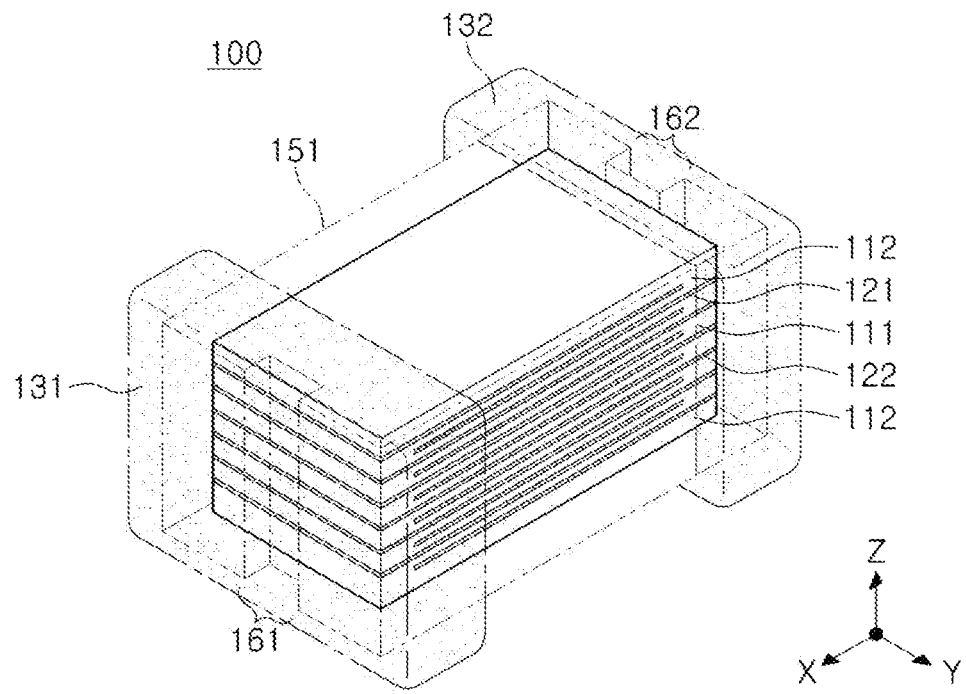
FIG. 4 is a perspective view projecting the inside of FIG. 1.
Figure 5:
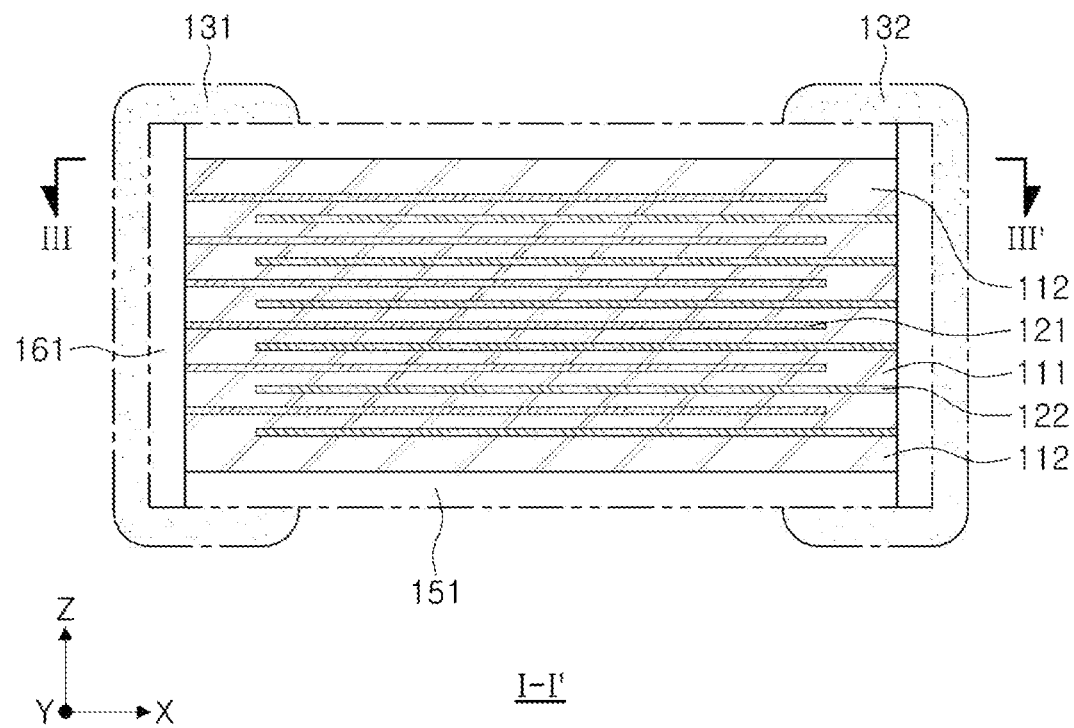
FIG. 5 is a cross-sectional view taken along line I-I' of FIG. 1.
Figure 6:
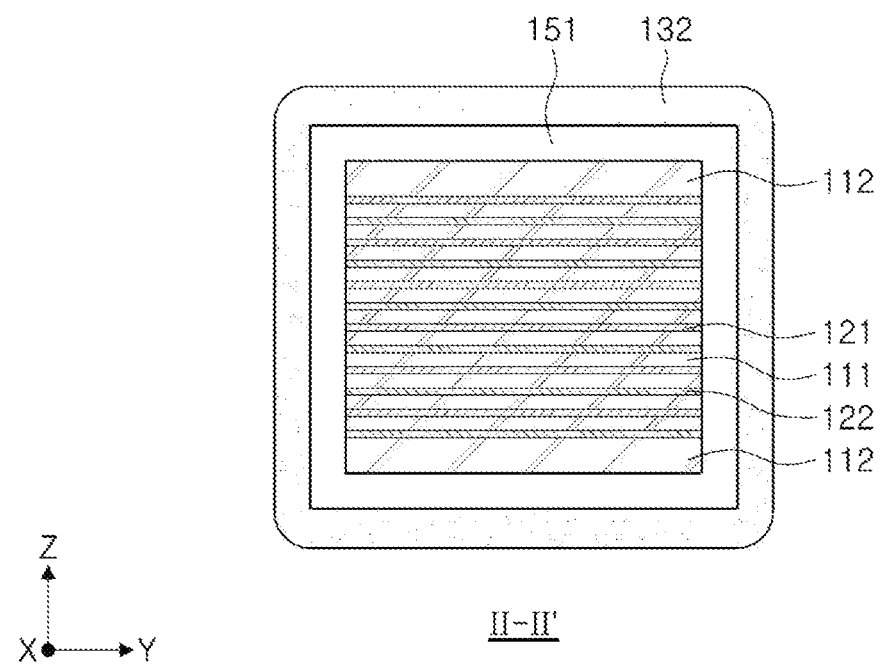
FIG. 6 is a cross-sectional view taken along line II-II' of FIG. 1.

FIG. 3 is a schematic perspective view illustrating a body in which a coating layer is disposed. Referring to FIG. 3, a multilayer ceramic electronic component according to an embodiment of the present disclosure may have a coating layer 151 disposed on first to sixth surfaces of a stacked portion. The fact that the coating layer 151 is disposed on the first to sixth surfaces of the stacked portion means that the coating layer 151 is substantially disposed on all surfaces of a body.

The coating layer 151 may be made of an insulating material, for example, a ceramic material such as barium titanate. In this case, the coating layer 151 may include the same ceramic material as that contained in the dielectric layer 111 described above, or may be made of the same material as the dielectric layer 111.

The coating layer 151 may function to prevent damage of the internal electrode due to physical or chemical stress, and may function to block intrusion of moisture or contaminants from the outside. Therefore, the reliability for moisture resistance of a multilayer ceramic electronic component according to the present disclosure may be improved.

The coating layer 151 may be a single layer. The fact that the coating layer 151 is a single layer means that the coating layer 151 is formed integrally with the body, not that the coating layer 151 is formed in a separate form on each surface of the body. In a case in which the coating layer 151 is a single layer, penetration of foreign substance such as penetration of moisture or the like may be effectively prevented due to the absence of a connection site, and the reliability for moisture resistance may be further improved. In addition, as compared with a case in which separate layers are bonded, an excellent mechanical strength may be provided, and cracking and the like may be effectively prevented.

Conventionally, an area of a dielectric layer was formed to be larger than an area of an internal electrode, and a marginal region was formed in the remaining peripheral portion of the internal electrode, excluding a portion connected to an external electrode. In this case, when several tens to several hundreds of dielectric layers were stacked, the dielectric layer was stretched to fill a step difference, and the internal electrodes were also bent. Further, in order to solve the above-described problems, when a separate margin portion was attached to a body, there was a problem that water was infiltrated into the margin portion or an attachment site was detached. The present disclosure may solve the above-described problems by forming the coating layer 151 into a single layer.

A method of forming the coating layer 151 is not particularly limited, and may be carried out, for example, by applying or spraying a slurry containing a ceramic material, and sintering the resulted, but the present disclosure is not limited thereto.

Figure 8:
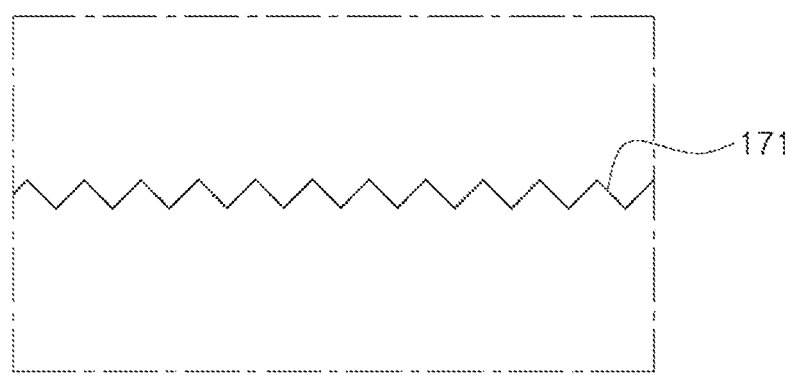
FIG. 8 is an enlarged view of portion A of FIG. 3.

In an example, the coating layer 151 may have a centerline average roughness (Ra) in a range of 0.01 μm to 1 μm. In the present specification, the "centerline average roughness (Ra)" may refer to an average value of distances to an imaginary centerline, and may be a value measured using a surface roughness meter SV-3200 manufactured by Mitutoyo. FIG. 8 is an enlarged view of portion A of FIG. 3. Referring to FIG. 8, a surface of the coating layer 151 may have irregularities 171, and the irregularities 171 may satisfy the centerline average roughness (Ra). The centerline average roughness (Ra) may be 0.01 μm or more, 0.02 μm or more, 0.03 μm or more, 0.04 μm or more, 0.05 μm or more, 0.06 μm or more, 0.07 μm or more, 0.08 μm or more, 0.09 μm or more, or 0.10 μm or more, and 1.0 μm or less, 0.95 μm or less, 0.90 μm or less, 0.85 μm or less, 0.80 μm or less, 0.75 μm or less, or 0.70 μm or less, but is not limited thereto. When the centerline average roughness (Ra) of the coating layer of the present disclosure satisfies the above range, an anchoring effect between the surface of the coating layer and the external electrode may improve a fastening force between the external electrode and the ceramic body. Therefore, the mechanical strength of the multilayer ceramic electronic component according to the present disclosure may be improved.

A method for causing the coating layer 151 to have the centerline average roughness (Ra) described above is not particularly limited, but may be carried out, for example, by using a process of spraying a slurry containing a ceramic material with a spray gun to have a desired roughness, or a process of polishing a surface of a body after a sintering operation, or the like.

In an embodiment of the present disclosure, a ratio of a minimum value to a maximum value in a width, length, or thickness of the coating layer 151 may be in a range of 0.7 to 1.0. The multilayer ceramic electronic component according to an embodiment of the present disclosure may form a single coating layer. Therefore, margin portions in both directions of the Y direction of the body may be removed, to prevent occurrence of a step difference due to the internal electrode. In addition, it is possible to prevent the internal electrodes from being bent and to prevent a decrease in a withstand voltage characteristic, to improve the reliability of the multilayer ceramic electronic component.

In an embodiment of the present disclosure, the first and second connection portions 161 and 162 may be arranged on the third and fourth surfaces of the body. FIG. 3 is a schematic perspective view illustrating the first and second connection portions 161 and 162 of the multilayer ceramic electronic component according to the present disclosure. Referring to FIG. 3, the first connection portion 161 may be disposed on the third surface of the body, and the second connection portion 162 may be disposed on the fourth surface of the body. The first connection portion 161 may be disposed in a region ranging from an edge in which the third surface and the first surface meet to an edge in which the third surface and the second surface meet. In addition, the second connection portion 162 may be disposed in a region from an edge in which the fourth surface and the first surface meet to an edge in which the fourth surface and the second surface meet. The first and second connection portions 161 and 162 may be arranged such that an uppermost dielectric layer and a lowermost dielectric layer of the body are exposed. The first and second connection portions 161 and 162 may be arranged to partially penetrate the body in the Z direction.

Therefore, the first and second connection portions 161 and 162 may be arranged on the third and fourth surfaces of the body, to have a shape similar to that of bottleneck type chips, and to improve connection between the internal electrode and the external electrode.

Figure 9:
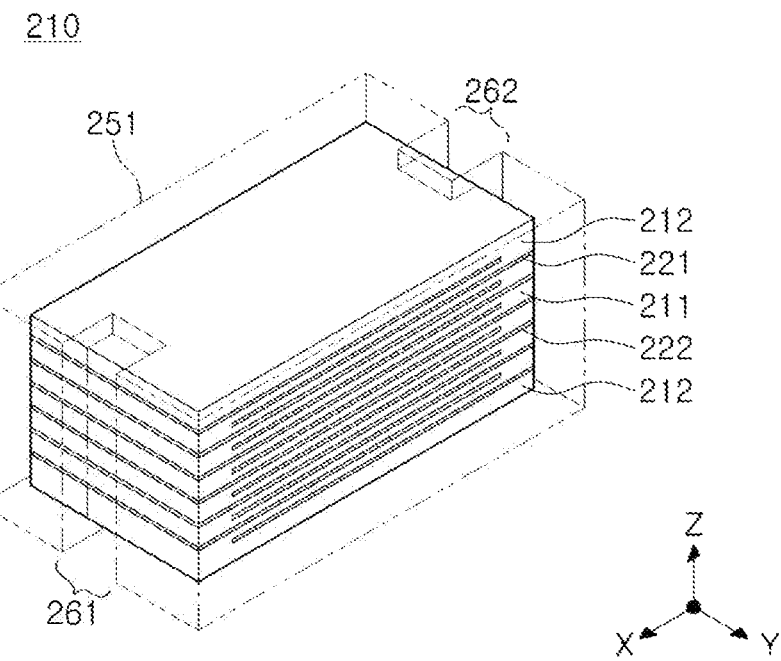
FIG. 9 is a schematic perspective view illustrating a body of a multilayer ceramic electronic component according to another embodiment of the present disclosure.
Figure 10:
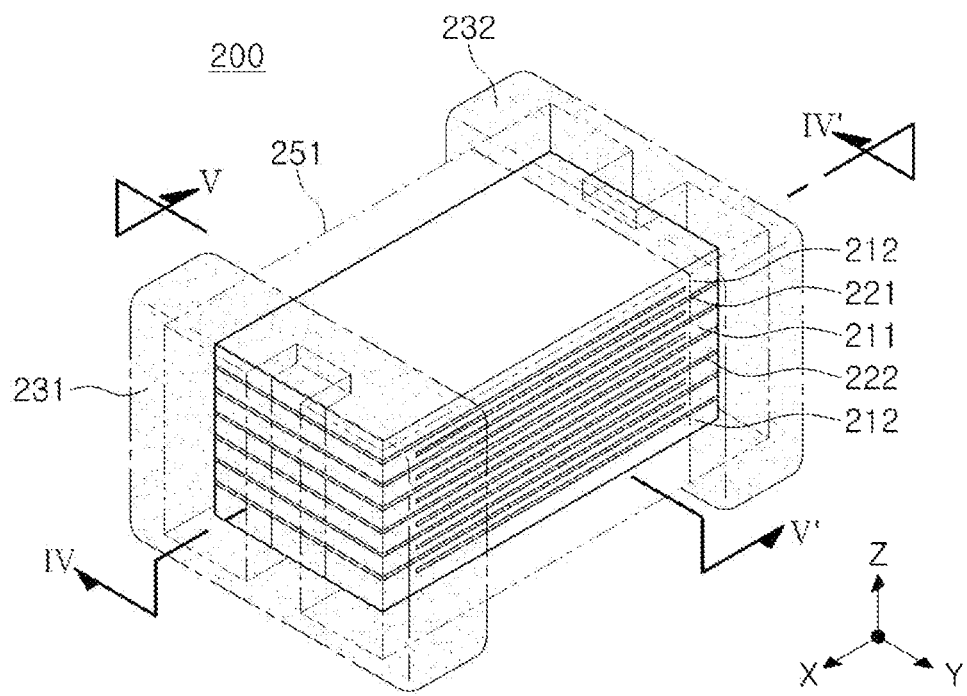
FIG. 10 is a schematic perspective view illustrating a structure in which external electrodes are disposed on the body of FIG. 9.
Figure 11:
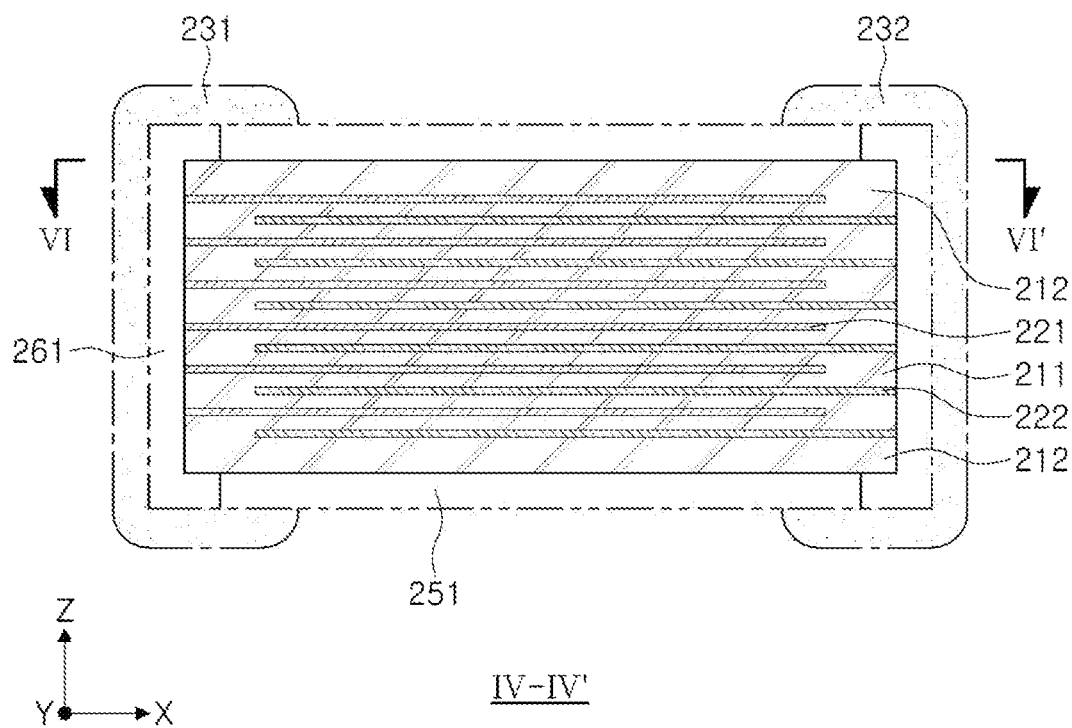
FIG. 11 is a cross-sectional view taken along line IV-IV' of FIG. 10.
Figure 12:
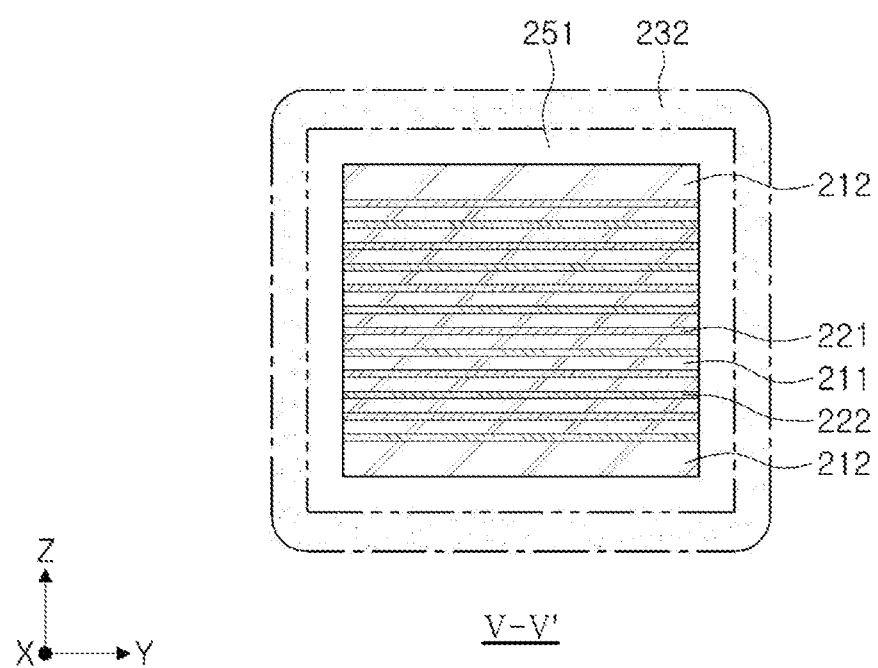
FIG. 12 is a cross-sectional view taken along line V-V' of FIG. 10.
Figure 13:
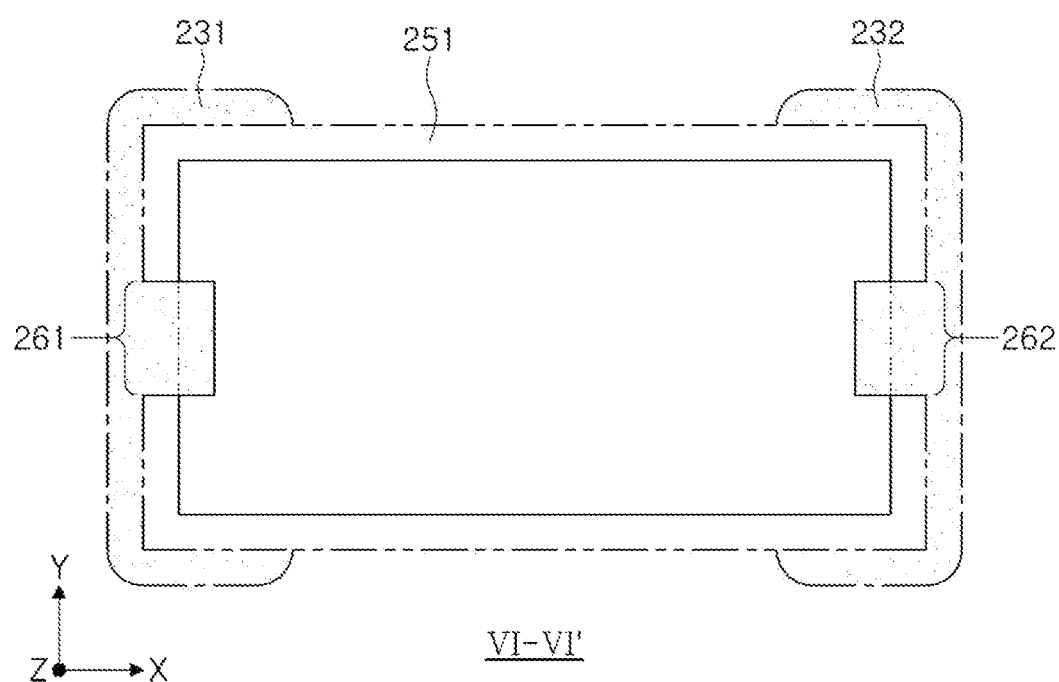
FIG. 13 is a plan view of FIG. 10.

In another embodiment of the present disclosure, first and second connection portions 261 and 262 may be extended to and arranged on the third and fourth surfaces of the body and on the first and second surfaces of the body. FIG. 9 is a schematic perspective view illustrating a shape of a body according to this embodiment. Referring to FIG. 9, the first and second connection portions 261 and 262 may be arranged on the third and fourth surfaces of the body, and, at the same time, may be also extended to and arranged on the first and second surfaces of the body. When the first and second connection portions 261 and 262 are arranged to extend to the first and second surfaces of the body, as in this embodiment, a contact area between the external electrode and the body may further increase, and a fastening force of the external electrode may be improved.

In an embodiment of the present disclosure, the connection portions 161 and 162 disposed in the coating layers 151 may have a hexahedral shape. The fact that the connection portion has a hexahedral shape may include deformation due to shrinkage in the sintering process, and may mean not only a hexahedral shape with perfectly straight lines but also a substantially hexahedral shape. The fact that the connection portion has a hexahedral shape means that a cross-sectional area thereof is substantially rectangular in any of the X, Y, and Z directions. Referring to FIG. 3, it can be seen that the connection portion 161 disposed on the third and fourth surfaces, among the first to sixth surfaces of the body, on which the coating layer 151 is disposed has a rectangular cross-sectional area in each of the X, Y, and Z directions, and is a hexahedral shape.

Figure 7:
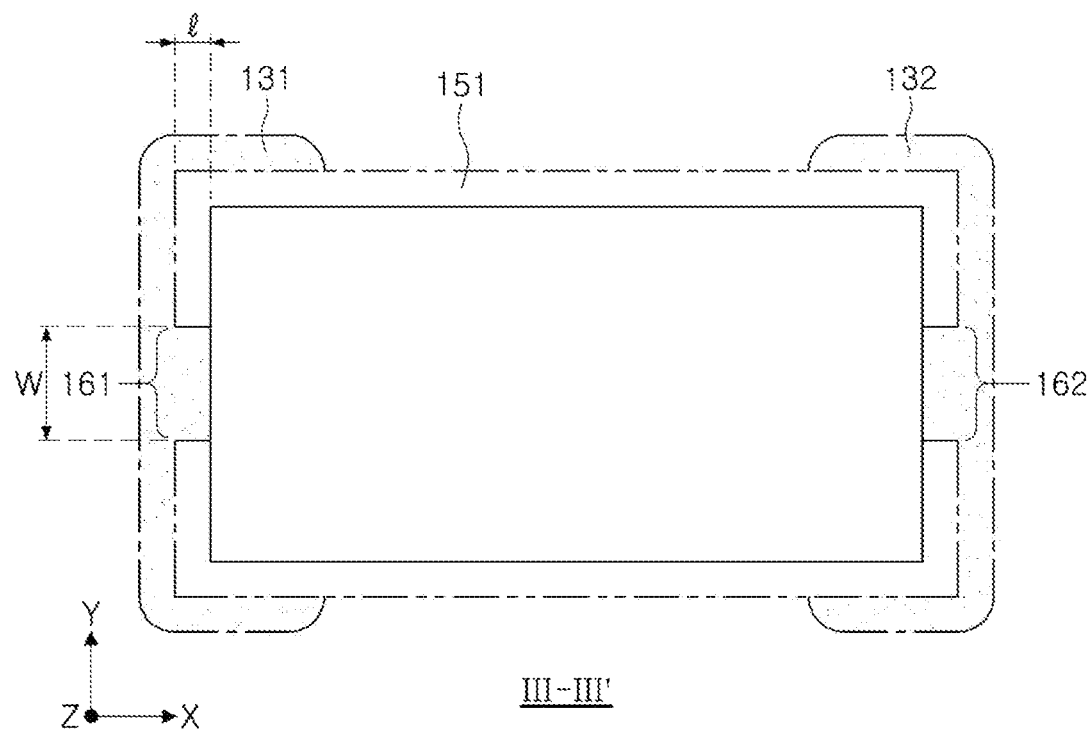
FIG. 7 is a plan view of FIG. 1.

In an example of the present disclosure, the lengths of the first and second connection portions 161 and 162 may be 40 µm or less. Referring to FIGS. 3 and 7, a length M of the first and second connection portions 161 and 162 may be a dimension of the coating layer in the X direction. The length M of the first and second connection portions 161 and 162 may be 40 µm or less, 39 µm or less, 38 µm or less, 37 µm or less, 36 µm or less, 35 µm or less, 34 µm or less, 33 µm or less, 32 µm or less, 31 µm or less, or 30 µm or less, and a lower limit thereof is not particularly limited, but may be, for example, 1 µm or more.

In an embodiment of the present disclosure, the widths of the first and second connection portions 161 and 162 may be 10 µm or more. Referring to FIGS. 3 and 7, a width (w) of the first and second connection portions 161 and 162 may denote a dimension of a portion in which the coating layer does not exist in the Y direction. The width (w) of the first and second connection portions 161 and 162 may be 10 µm or more, 11 µm or more, 12 µm or more, 13 µm or more, 14 µm or more, or 15 µm or more, and an upper limit thereof is not particularly limited, but may be less than or equal to the sum of the widths of the body and the coating layer.

The method of forming the first and second connection portions 161 and 162 in the coating layer 151 is not particularly limited. For example, after the coating layer is formed on the body, the coating layer formed on the third and fourth surfaces of the body may be removed by using a laser cutter, a wheel cutter, a grinder, or the like, to form the first and second connection portions 161 and 162.

According to an embodiment of the present disclosure, a single coating layer may be applied to improve the mechanical strength, prevent the cracking, and improve the reliability for moisture resistance.

According to another embodiment of the present disclosure, it is possible to provide a multilayer ceramic electronic component having improved mechanical strength in which the roughness of the coating layer may be adjusted to increase the fastening force between the body and the external electrode.

According to another embodiment of the present disclosure, a structure and size of the connection portion may be freely adjusted by forming the coating layer on all surfaces of the body and forming the connection portion.

It can be understood that the various and advantageous advantages and effects of the present disclosure is not limited to those described above, and can be more readily understood in the course of describing a specific embodiment of the present disclosure.

While example embodiments have been illustrated and described above, it will be apparent to those skilled in the art that modifications and variations could be made without departing from the scope of the present disclosure as defined by the appended claims.

What is claimed is:
1. A multilayer ceramic electronic component comprising:
a body, including
a dielectric layer,
first and second internal electrodes,
a stacked portion including first and second surfaces opposing each other in a stacking direction of the first and second internal electrodes, third and fourth surfaces connected to the first and second surfaces and opposing each other, and fifth and sixth surfaces connected to the first and second surfaces, connected to the third and fourth surfaces, and opposing each other, and
a coating layer disposed on the first to sixth surfaces of the stacked portion and having
first and second connection portions extending to the first and second internal electrodes, respectively; and
first and second external electrodes respectively arranged on the third and fourth surfaces of the body and connected to the first and second internal electrodes, respectively through the first and second connection portions,
wherein the first and second internal electrodes and the first and second external electrodes are in contact with the first and second connection portions, respectively.
2. The multilayer ceramic electronic component according to claim 1, wherein the coating layer is a single layer.
3. The multilayer ceramic electronic component according to claim 1, wherein the coating layer comprises a ceramic material.
4. The multilayer ceramic electronic component according to claim 3, wherein the ceramic material comprises barium titanate.
5. The multilayer ceramic electronic component according to claim 1, wherein the coating layer has a centerline average roughness (Ra) in a range from 0.01 µm to 1 µm.
6. The multilayer ceramic electronic component according to claim 1, wherein a ratio of a minimum value to a maximum value in a width, length, or thickness of the coating layer is in a range from 0.7 to 1.0.

7. The multilayer ceramic electronic component according to claim 1, wherein the connection portions have a rectangular parallelepiped shape.

8. The multilayer ceramic electronic component according to claim 1, wherein the first and second connection portions are respectively arranged on the third and fourth surfaces of the body.

9. The multilayer ceramic electronic component according to claim 1, wherein the first and second connection portions are respectively extended to and arranged on the third and fourth surfaces of the body and the first and second surfaces of the body.

10. The multilayer ceramic electronic component according to claim 1, wherein a length of each of the first and second connection portions is 40 μm or less.

11. The multilayer ceramic electronic component according to claim 1, wherein a width of each of the first and second connection portions is 10 μm or more.

12. The multilayer ceramic electronic component according to claim 1, wherein the first and second external electrodes extend into the first and second connection portions, respectively.

13. The multilayer ceramic electronic component according to claim 1, wherein at least one of the first or second connection portions extends to each of the first or second internal electrodes, respectively.

14. The multilayer ceramic electronic component according to claim 1, wherein an average thickness of the first and second internal electrodes is 0.4 μm or less.

15. A multilayer ceramic electronic component comprising:
a body including
first and second internal electrodes stacked in a stacking direction with a dielectric layer interposed between each pair of first and second internal electrodes, the first and second internal electrodes being exposed respectively to longitudinally opposing surfaces of the body, a longitudinal direction being perpendicular to the stacking direction, and
a coating layer disposed on all surfaces of the body, and having first and second connection portions along the longitudinally opposing surfaces to expose the first and second internal electrodes through the coating layer; and
first and second external electrodes disposed on the longitudinally opposing surfaces of the body and connected respectively to the first and second internal electrodes through respectively the first and second connection portions,
wherein the first and second internal electrodes and the first and second external electrodes are in contact with the first and second connection portions, respectively.

16. The multilayer ceramic electronic component of claim 15, wherein the coating layer is a single layer.

17. The multilayer ceramic electronic component of claim 15, wherein the coating layer comprises a same material as the dielectric layer interposed between the first and second internal electrodes.

18. The multilayer ceramic electronic component of claim 15, wherein a dimension of the first and second connection portions taken in a width direction perpendicular to the stacking and longitudinal direction is smaller than or equal to a dimension of a corresponding of the longitudinally opposing surfaces.

19. The multilayer ceramic electronic component of claim 15, wherein a dimension of the first and second connection portions taken in the stacking direction perpendicular is smaller than or equal to a dimension of a corresponding of the longitudinally opposing surfaces.

20. The multilayer ceramic electronic component of claim 15, wherein the first and second connection portions are shaped as a recess in the coating layer.

21. The multilayer ceramic electronic component of claim 15, wherein the coating layer comprises barium titanate.

22. The multilayer ceramic electronic component of claim 15, wherein the first and second external electrodes extend into the first and second connection portions, respectively.

23. The multilayer ceramic electronic component of claim 15, wherein at least one of the first or second connection portions exposes each of the first or second internal electrodes, respectively, through the coating layer.

24. The multilayer ceramic electronic component of claim 15, wherein an average thickness of the first and second internal electrodes is 0.4 μm or less.

* * * * *